United States Patent Office 2,927,884
Patented Mar. 8, 1960

2,927,884

TREATMENT OF KETOSIS WITH ACTH AND ASPIRIN

Christian P. Segard, Leonia, N.J., assignor to Wisconsin Alumni Research Foundation, Madison, Wis., a corporation of Wisconsin No Drawing. Application February 3, 1953
Serial No. 334,956

2 Claims. (Cl. 167—53)

The present invention relates to the treatment of cattle and more specifically to the treatment of ketosis or acetonemia in dairy cattle.

Ketosis or acetonemia is a disease of dairy cattle i.e. cattle employed as milk producers. It presents no problem in range cattle. The prevalence of the disease, as a type of starvation, in dairy cattle has been recognized for some time. However, it has become more or less acute "as evolution is interfered with" and the tendency to breed and inter-breed high milk producing cattle to produce still higher milk producers is stressed.

Ketosis occurs at the time of freshening shortly after the calf is dropped. It is noted by the refusal of the cow to eat and drink, depressed appearance, and by the bad odor of the breath and urine. Milk production drops off to about nil and the cow may lapse into a coma, some die. The net result may be the total loss of the cow, or, still, where the cow finally recovers, the suffering of a terrific loss in milk production by the farmer.

The reason why ketosis develops in dairy cattle at the time of freshening is not fully understood. It is probable that various physiological and biochemical factors are involved. Investigations have determined, however, that the cow is placed under an enormous physiological stress at the time of freshening. Not only has a 50-70 pound calf been dropped, but the cow must respond suddenly to a change in milk production of none to a high daily output. Under these conditions of stress, the medulla of the adrenal gives off an excess of epinephrin (adrenalin), which in turn stimulates the hypothalamus which liberates a pituitary control factor, which in turn stimulates the pituitary which liberates ACTH (adrenocorticothrophic hormone), which in turn stimulates the cortex which liberates cortisone. This completes the cycle and the end result of the stress reaction may be ketosis. The increased activity of the adrenals also maintains an excess of steroids in the blood during ketosis or the starvation period. Charipper, Gordon and D'Angelo, Endocrinology 42, 399 (1948).

Attempts of various sorts have been made by many investigators to solve the ketosis problem in dairy cattle. All of them for the most part have proven unsuccessful or generally impractical. The injection of dextrose and the feeding of sugar such as molasses has been a common treatment with varying results. A relatively recent solution to the problem, however, has been proposed by investigators working at the University of Maryland. These research workers found that massive doses of around 1500–3000 mg. of cortisone or 300 I.U. of ACTH administered intramuscularly relieved the symptoms of ketosis and brought about increased milk production in from about 2 to 4 days. Shaw, J. C., University of Maryland, Agricultural Exper. Sta. Bull. 139, June 1952; Shaw, J. C., et al., Hoards Dairyman, June 1951. While the available data shows that these recent cortisone and ACTH treatments may be employed successfully to combat or effectively cure ketosis, they possess the following disadvantages: (1) they require the use of large amounts of expensive drugs which are needed in human therapy, (2) they require the services of skilled personnel such as a veterinarian for repeated injections, and (3) some evidence is accumulating which indicates massive doses of cortisone or ACTH to be accompanied by unwanted side reactions and to be contra-indicated if other therapy is available.

In an attempt to find a more practical solution to the ketosis problem free from the above disadvantages, I tried aspirin as an adjunct therapy with ACTH. The results obtained were encouraging and with further research I discovered that large doses of the relatively inexpensive salicylic acid compounds such as aspirin or the equivalent, could be used in place of ACTH or cortisone. While these expensive steroid drugs may be eliminated completely in my treatment, I prefer, as there is a lag in the salicylate therapy, to initiate the treatment with a single small dose of about 20 mg. of ACTH and then immediately continue with large doses of the salicylic acid compound. The preferred treatment with or without the initial minor dose of ACTH is about 4 grams of aspirin 4 times daily for 3 days. The optimum dosage may vary but a minimum daily dose of at least 10 grams of aspirin or equivalent for several days, at least 2 and preferably 3 days, is indicated. Larger doses than the preferred 16 grams daily for 3 days may be administered although they are seldom accompanied by any significant added beneficial effects. It is generally preferred to employ acetyl-salicylic acid, commonly known as aspirin, but any of the well known therapeutically equivalent salicylic acid compounds and salts thereof may be employed. A sodium salt of salicylic acid is not contra-indicated as in man since the cow is not a meat eater and needs a sodium salt at times. Illustrative salicylic acid compounds suitable for use in the present invention are disclosed in Link U.S. Patent 2,385,365, dated September 25, 1945. When administered in the proper dosages described above, they eliminate ketosis in dairy cattle with restoration of milk production in 3 to 4 days.

The use of the salicylic acid compounds is advantageous (1) because the chemicals are relatively inexpensive—in fact, cheap, (2) because the attendance of a professional veterinarian is not required after the first visit for diagnosis and possible ACTH injection as the salicylic acid compounds are administered by mouth, and (3) no evidence of unwanted side reactions has been noted. With reference to (2) above, the salicylic acid compounds are administered orally and preferably by way of a tube inserted past the esophageal groove so that the salicylic acid compound will not be regurgitated with the cud or remain in the rumen or reticulum and not be absorbed. This procedure may be readily done by the farmer, by placing the salicylic acid compound in a rubber or other flexible tube, inserting the tube in the cow's mouth and throat past the groove, and then displacing the salicylic acid compound by blowing through the tube. The "Balling Gun" is the method of choice used by the veterinary profession and by the herdsman or farmer for this purpose. It is a simple operation and eliminates the expense entailed when professional or medical personnel are required for each administration.

Just how the salicylic acid compounds operate to cure ketosis or acetonemia in dairy cattle is not completely understood. However, while the present invention is not limited thereto, the salicylate therapy literature contains some reported data that may throw some light on the overall theory of operation. It is known, for example, when the carbohydrate intake of a cow falls below a minimum and a high fat food intake continues, that a dietary ketosis results. In ketosis, it is also known that the intake or production of carbohydrates is not sufficient and as a result that the fats are not properly metabolized. This incomplete fat metabolism in part gives rise to ketosis and the bad odor of the breath and urine. There is some evidence that adrenalin neutralizes insulin or the insulin agency, and as adrenalin is normally present in excessive amounts during periods of stress, it is possible that adrenalin prevents the insulin or insulin agency from functioning properly, the carbohydrates to be burned and the fats to be properly metabolized. There is also some evidence that salicylic acid compounds act as a mediator (booster) in insulin action and directly affect carbohydrate liberation and metabolism. It has been reported in this connection that while small amounts of aspirin increase sugar (glycogen) storage in the liver, that large amounts of salicylates act on the liver causing glycolysis and thus hyperglycemia. "The Salicylates" by Gross and Greenberg, Hillhouse Press, New Haven (1948). It is also known that a low level of aspirin intake has a temperature regulation effect on the hypothalamus and it is possible that large doses of aspirin or other salicylic acid compound further stimulates the hypothalamus freeing the pituitary control factor which in turn causes the pituitary to liberate ACTH. There is good evidence that this takes place and it explains why the administration of large doses of salicylic acid compounds cuts down on the production of adrenalin. This latter result regardless of how produced, makes it possible for the normal amount of insulin or even decreased amounts required in the system to function properly, and as the blood is provided with an increased amount of readily burnable carbohydrate (sugar) the fat is metabolized and ketosis disappears. The available evidence thus shows that the picture is complex, that no one effect of the salicylic acid compound is probably adequate in itself, and that the combined effects of the salicylate therapy are probably responsible for the cure of ketosis in dairy cattle. While aspirin or equivalent salicylic acid compound alone has proven effective, nevertheless, since during the disease the cow normally does not eat an adequate diet there is a lack of vitamin K intake. Recent investigations have therefore found it preferable to give vitamin K in combination with the aspirin as described in the above referred to Link Patent No. 2,385,365.

I claim:

1. The method of treating ketosis or acetonemia in dairy cattle which comprises initiating the treatment with an injection of about 20 mg. of ACTH, and then immediately administering orally about 4 grams of aspirin 4 times daily for 3 days, said aspirin being administered orally past the cow's esophageal groove to prevent regurgitation.

2. The method of treating ketosis or acetonemia in dairy cattle which comprises initiating the treatment with an injection of a minor amount of ACTH, and then administering orally several grams of aspirin several times daily for 2 to 3 days, the amount of aspirin administered being sufficient to provide at least a daily dose of 10 grams, said aspirin being administered orally past the cow's esophageal groove to prevent regurgitation.

References Cited in the file of this patent

Shaw: J. Dairy Science, vol. 29, 1946, pp. 151–155.
Milks—Milks Vet. Pharmacol. Materia Medica and Ther., p. 368, Alex Eger Inc., Chicago, 1949.
Hutya, Marek and Manninger: Pathology and Therapeutics of the Diseases of Domestic Animals, vol. III, p. 482, Alex Eger, Chicago, 1938.
D. J. Ingle: Proc. Soc. Expt. Biol. Med., vol. 75, 1950, pp. 673–4.
J. C. Shaw et al.: Science, November 30, 1951, p. 114.